United States Patent [19]

Mefferd et al.

[11] 4,060,259
[45] Nov. 29, 1977

[54] IMPLEMENT TRANSPORTING DEVICE

[76] Inventors: Roy J. Mefferd, 219 W. Myrtle, Laurens, Iowa 50554; Gregory L. Mangold, Rural Route, Linn Grove, Iowa 51033

[21] Appl. No.: 710,431

[22] Filed: Aug. 2, 1976

[51] Int. Cl.² .............................................. B62D 53/00
[52] U.S. Cl. ................................. 280/656; 280/43.22; 280/43.23
[58] Field of Search ............. 280/43.22, 43.23, 415 R, 280/491 C, 656, 491 A, 490 R; 172/240, 246, 316, 413, 448, 491

[56] References Cited

U.S. PATENT DOCUMENTS

| 1,212,527 | 1/1917 | McCrery | 280/43.22 |
|---|---|---|---|
| 1,697,391 | 1/1929 | Lair | 280/43.22 |
| 2,996,307 | 8/1961 | Debailleux | 172/240 X |
| 3,437,353 | 4/1969 | Lange | 280/656 |
| 3,515,408 | 1/1970 | Cagle | 280/656 |
| 3,738,684 | 6/1973 | Lusk | 280/491 A |
| 3,912,018 | 10/1975 | Brundage | 280/490 R |

*Primary Examiner*—Robert R. Song

*Attorney, Agent, or Firm*—Zarley, McKee, Thomte, Voorhees & Sease

[57] ABSTRACT

The present invention comprises an elongated implement, having an elongated implement frame, implement wheels, pivotal about an axis parallel to the longitudinal axis of the implement, and tongue means extending transversely from the longitudinal axis of the implement intermediate the ends thereof. A transporting wheel assembly is mounted to the implement frame and comprises a pair of spaced apart vertical legs, each of which have upper and lower leg members which are vertically extensibly mounted with respect to one another. Each of the lower leg members has a transporting wheel mounted thereon for rotation about an axis transverse to the longitudinal axis of the implement. Power means are connected to the legs for causing vertical extensive movement thereof from a retracted position wherein the wheels are above the implement wheels to an extended position wherein the transporting wheels are below the implement wheels. A transporting tongue assembly is mounted to one end of the elongated implement and has a transporting tongue for attaching to a pulling vehicle.

8 Claims, 6 Drawing Figures

U.S. Patent    Nov. 29, 1977    4,060,259
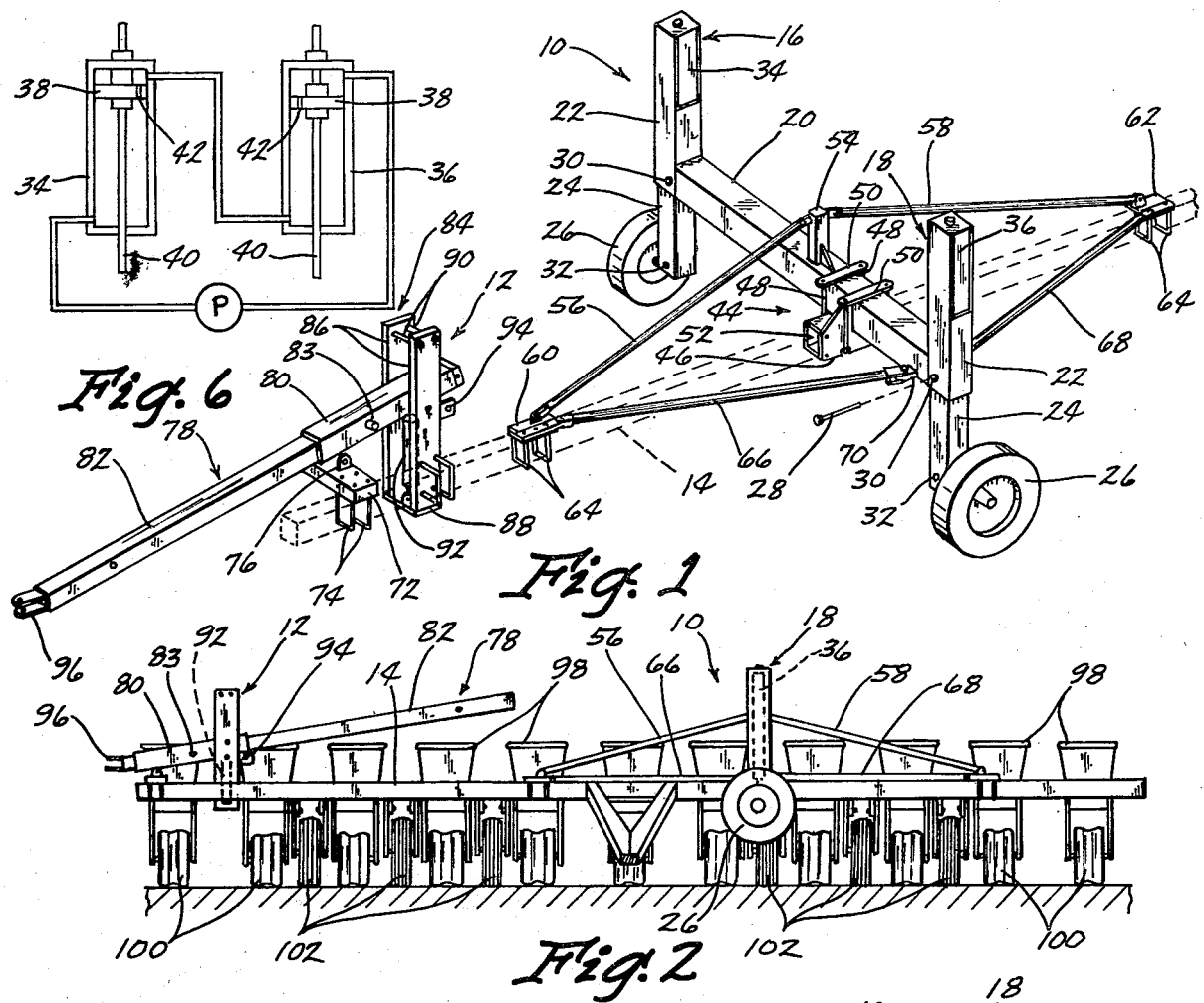
Fig. 6
Fig. 1
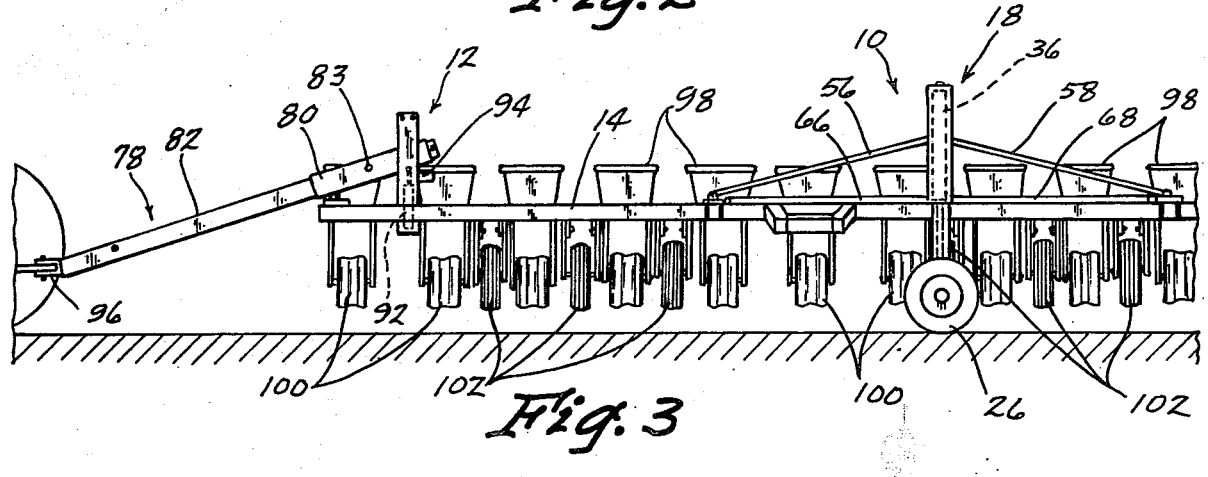
Fig. 2
Fig. 3
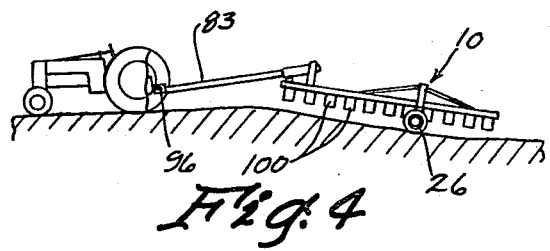
Fig. 4
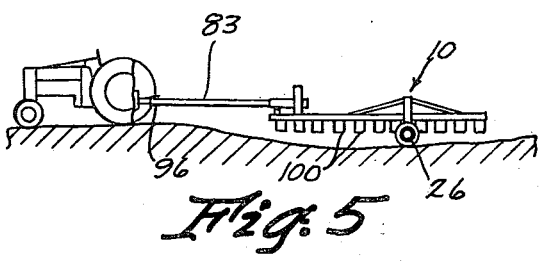
Fig. 5

IMPLEMENT TRANSPORTING DEVICE

SUMMARY OF THE INVENTION

This invention relates to an implement transporting device and particularly to a device for transporting implements which are very long.

Many farm implements presently used are quite long and are adapted to handle as many as 12 or more rows of the particular crop being planted by the farmer. Examples of such implements are corn planters, cultivating machines, and other implements for handling a multitude of crop rows at one time.

These implements are pulled through the field by a tractor in a direction which is transverse to the longitudinal axis of the implement. However, when it is desired to transport the implement from one field to another, great difficulty is encountered in transporting the implement over highways and roads. Because of the width of the implement, it is impossible to pull the implement along a highway or road in a direction transverse to the longitudinal axis of the implement as would be the case while the implement is being used in the field.

For transporting implements such as planters, various devices have been utilized, the most prominent of which is a specially designed trailer for carrying the implement in a direction parallel to the longitudinal axis of the implement. These trailers are cumbersome and require a considerable amount of the farmer's time for mounting the implement thereon. It is not uncommon for a farmer to require as long as an hour or more to mount the implement on such a trailer.

Another problem encountered with trailers presently being used is the inability of these trailers to adapt to rough terrain as is often encountered in the fields and in the driveways leading from the fields to the highway. Because the implements are extremely long, rough terrain often results in either one end or the other dragging on the ground, or in some cases in bridging of the implement when the wheels of the trailer encounter a dip in the ground.

The present invention provides two assemblies which are mounted directly to the farm implement. One assembly includes wheels which are hydraulically movable into and out of engagement with the ground. When it is desired to transport the vehicle, the wheels are lowered to engage the ground and to lift the implement off of the ground for transporting in a direction parallel to the longitudinal axis thereof.

The present invetion also contemplates the mounting of a tongue assembly to one end of the implement. The dtongue assembly is adapted to be connected to a pulling vehicle for pulling the implement in a direction parallel to the longitudinal axis thereof. The tongue includes hydraulic means thereon for raising and lowering the end of the implement to accommodate grounds of rough terrain. Thus, when an incline is encountered, it is possible by means of the hydraulic cylinder to lift the front end of the implement so that it will not drag on the ground. Similarly, on a downward incline, it is possible to lower the front end of the implement so that the rearward end of the implement will not drag on the ground.

By means of the present invention, a single farmer can convert an implement from its operating position in the field to a transport position for transporting on a highway within a matter of 5 to 10 minutes. This is a considerable improvement over the hour or longer necessary for mounting the implement on a trailer. Similarly, the unit can be converted again to the operative position merely by raising the transporting wheels out of engagement with the ground and by folding the tongue assembly at the forward end of the implement. This takes only a matter of moments, and the implement is ready for operating in the field.

Therefore, a primary object of the present invention is the provision of an improved means for transporting elongated farm implements in a direction parallel to the longitudinal axis of these elongated implements.

A further object of the present invention is the provision of a device which can be converted from the transport position to the work position within a matter of moments.

A further object of the present invention is the provision of a transporting device which can be converted from the transport position to the working position by a single operator.

A further object of the present invention is the provision of a transporting device which permits the implement to be raised and lowered in order to accommodate varying terrains in the ground.

A further object of the present invention is the provision of a transporting device which utilizes only two wheels, but which minimizes the deflection of the elongated farm implement when transported by these wheels.

A further object of the present invention is the provision of a device which is economical, durable in use, and simple in construction.

DESCRIPTION OF THE FIGURES OF THE DRAWING

FIG. 1 is a perspective view of the present invention showing the tool bar of a farm implement in shadow lines.

FIG. 2 is a front elevational view of a farm implement having the present invention thereon.

FIG. 3 is a view similar to FIG. 2, showing the transporting device in the transport position.

FIG. 4 and FIG. 5 are illustrations of the present invention and its adaption to grounds of varying topography.

FIG. 6 is a schematic view of the hydraulic cylinders utilized in the present invention.

DETAILED DESCRIPTION OF THE DRAWINGS

Referring to FIG. 1, a transport wheel assembly 10 and a transport tongue assembly 12 are shown. An elongated implement frame often referred to as a tool bar is designated by the numeral 14.

Transport wheel assembly 10 has an H-shaped frame comprising two vertical legs 16, 18 and a cross-bar or frame 20. Each of legs 16, 18 include an upper tubular member 22 and a lower tubular member 24 which is telescoped therein for vertical telescopic movement. Upper members 22 are rigidly fixed to cross-bar 20 by welding or the like. The lower ends of lower tubular members 24 are each provided with wheels 26 which are pivotally mounted about an axis transverse to the longitudinal axis of tool bar 14. A safety pin 28 is adapted to extend through a hole 30 in upper tubular member 22, and also to extend through one of two spaced apart holes 32 in lower tubular member 24. When pin 28 is inserted through the upper hole 32, (not shown) in tubular member 24, it locks the tubular members in a fully extended position. The lower hole 32 may be utilized for locking the wheels in their upper position such as shown in FIG. 2.

Within vertical legs 16 and 18 are a pair of hydraulic cylinders 34, 36, each of which include a piston 38 and a piston rod 40. Cylinders 34, 36 are anchored to the upper ends of upper tubular members 22 and piston rods 40 are connected to the lower tubular members 24 so that extension and retraction of the cylinders causes extension and retraction of the tubular members with respect to one another.

The cylinders are connected in a master-slave relationship such as shown in FIG. 6. Each piston is provided with a pressure relief valve 42. This pressure relief valve permits the cylinders to fully extend to their extreme position so that the wheels 26 will always be of equal height. For example, when the wheels are lifted if the piston within cylinder 34 reaches its upper position before the piston within cylinder 36, the pressure relief valve 42 within cylinder 34 will permit fluid to continue flowing into the lower end of cylinder 36, until the piston therein has reached its extreme upper position.

Similarly, when the wheels are lowered fluid is pumped first into the upper end of cylinder 36. If the piston within cylinder 36 reaches the lower end of the cylinder before the piston within cylinder 34 reaches the lower end thereof, the fluid will continue flowing through pressure relief valve 42 in piston 36, until both pistons have reached their extreme lower positions. This eliminates the need for a farmer to bleed the hydraulic systems in order to maintain the wheels at equal heights. The wheels extend to their full upper and lower positions automatically regardless of inequalities that may occur in the hydraulic circuit.

The H-shaped frame formed by cross-bar 20 and vertical legs 16 and 18 is secured to tool bar 14. A clamp device 44 includes a vertical reinforcing plate 46 which is rigidly welded to crossbar 20. A pair of U-shaped bolts 48 extend around vertical plate 46 below tool bar 14 and upwardly to be secured to cross plate 50. Cross plate 50 interconnect the upper ends of the two U-shaped bolts 48. Another U-shaped bolt 52 extends around tool bar 14 and has its ends anchored in apertures within vertical plate 46. Thus, bolts 48 and 52 rigidly secure cross-bar 20 to tool bar 14 of the implement.

Extending upwardly from cross-bar 20 is a vertical post 54. Pivotally secured to vertical post 54 and extending outwardly from opposite sides thereof are a pair of upper struts 56, 58. Struts 56, 58 are anchored to plates 60, 62, respectively, which in turn are rigidly attached to tool bar 14 by means of U-shaped bolts 64.

A pair of lateral struts 66, 68 are each secured at one of their ends to cross-bar 20 at a point spaced laterally away from tool bar 14. This pivotal connection is made to ears 70 which are attached to cross-bar 20. The other ends of lateral struts 66, 68 are attached to plates 60, 62.

Upper struts 56, 58 provide reinforcement of tool bar 14 to prevent vertical bending thereof during transporting. Similarly, lateral struts 66,68 reinforce tool bar 14 against lateral bending during transporting.

Transport tongue assembly 10 includes a fulcrum bar 72 which is operatively secured to tool bar 14 by means of U-shaped bolts 74. Fulcrum bar 72 includes a pair of spaced apart ears 76. A telescoped tongue 78 includes a collar member 80 and a tube member 82 which is slidably telescoped within collar member 80 for longitudinal telescopic movement. Collar member 80 is pivotally mounted to ears 76 about a horizontal axis which is transverse to the longitudinal axis of tool bar 14. Tube member 82 is slidable within collar member 80 from an extended position shown in FIG. 1 to a retracted position shown in FIG. 2. A lock pin 83 is adapted to extend through registered holes within collar member 80 and tube member 82 so as to lock the tube member in either its extended or retracted positions.

Mounted rearwardly from fulcrum bar 72 is a guide yoke 84 which includes a pair of spaced apart vertical members 86 and a base plate 88. Spacer bars 90 interconnect the upper ends of members 86 and hold them in spaced relationship. Collar member 80 is slidably embraced between spaced apart members 86 so that pivotal movement of telescope tongue 78 about the pivotal connection with ears 76 causes collar member 80 to move upwardly and downwardly within guide yoke 84.

A hydraulic cylinder 92 is connected at one of its ends to base plate 88 of yoke 84 and at the other of its ends to collar member 80 at a point spaced from ears 76. Thus, extension and retraction of hydraulic cylinder 92 causes pivotal movement of tongue 78 about the fulcrum provided at ears 76.

A safety pin 94 extends between vertical members 86 at a point spaced below collar member 80. The purpose of safety pin 94 is to provide a limit to the downward movement of collar member 80 within yoke 84. Thus, if cylinder 92 fails during transporting of the vehicle, safety pin 94 limits the downward movement of collar member 80 within yoke 84.

The forward end of tongue 78 includes a clevis 96 for mounting to the pulling vehicle.

FIGS. 2 and 3 illustrate the present invention mounted on a corn planter. The corn planter includes a tool bar 14 and a plurality of planting boxes 98. The corn planter has two systems of support wheels for transporting the planter in a direction transverse to the longitudinal axis of tool bar 14. During the planting operation, the planter is supported by planting wheels 100. For transporting the corn planter without performing the planting function, a plurality of implement transporting wheels 102 are provided. These wheels may be pivoted upwardly to a position out of engagement with the ground or they may be pivoted downwardly to a position wherein they support the planter with planting wheels 100 above the ground. Transporting wheels 102 however, permit only the transporting of the corn planter in a direction transverse to the longitudinal axis of cross-bar 14.

Transporting wheel assembly 10 is mounted to crossbar 14 at a point slightly rearwardly of the longitudinal center thereof. Transport tongue assembly 12 is mounted to the forward end of cross-bar 14.

In FIG. 2, the tranport wheel assembly 10 and tongue assembly 12 are shown in the inoperative or field positions. Wheels 26 are retracted to their upper position and tube member 82 is retracted fully so that it does not extend a substantial distance beyond the end of tool bar 14. It is locked in this position by means of lock pin 83.

When it is desired to transport the planter from one field to another, the hydraulic systems for cylinders 92, 34 and 36, are connected to the tractor in conventional fashion. Tongue 78 is moved to its extended position and clevis 96 is connected to the tractor. Hydraulic cylinders 34, 36 are moved to their fully extended position so that wheels 26 engage the ground and lift the planter wheels off the ground. Tendencies of tool bar 14 to bend in a vertical direction are inhibited by upper struts 56, 58 and the tendencies of the tool bar 14 to bend in a lateral direction are inhibited by lateral struts 66, 68. The position of wheel assembly 10 is chosen so as to place approximately 8% of the weight of the planter on tongue assembly 12. Hydraulic cylinder 92 is adjusted to raise or lower tongue assembly 12 to place the planter in the proper horizontal attitude.

Referring to FIGS. 4 and 5, the hydraulic cylinder 92 may be extended and retracted to raise and lower the front end of the planter during transporting. In FIG. 4, the planter is shown being pulled over an incline, and hydraulic cylinder 92 is extended so as to cause pivotal movement of the tongue assembly about the fulcrum at ears 76 thereby lifting the front end of the planter. Retraction of the hydraulic cylinder 92 causes the opposite effect and lowers the front end of the planter for going down a downward incline. FIG. 5 shows the planter in a horizontal position for transporting across horizontal terrain.

What is claimed is:

1. A device of the kind described, comprising:
    an elongated implement having an elongated implement frame, implement wheels pivotal about an axis parallel to the longitudinal axis of said implement, and tongue means extending transversely from said longitudinal axis of said implement intermediate the opposite ends thereof;
    a transporting wheel assembly mounted to said implement frame intermediate the opposite ends thereof, said wheel assembly comprising a pair of spaced-apart vertical legs, each of said legs having upper and lower leg members, means for rigidly securing said upper leg member to said implement frame, said lower leg member being vertically extensibly mounted with respect to said upper leg member each of said lower leg members having a transporting wheel mounted thereon for rotation about an axis transverse to the longitudinal axis of said implement;
    power means connected to said legs for causing vertical extensive movement of said lower leg member from a retracted position wherein said transporting wheel is above said implement wheels to an extended position wherein said transporting wheels are below said implement wheels;
    a transporting tongue assembly mounted to one end of said elongated implement frame and having a transporting tongue for attaching to a pulling vehicle.

2. A device according to claim 1 wherein said transporting tongue assembly comprises a base portion rigidly secured to said implement frame, said tongue being pivotally mounted to said base portion for swinging movement about an axis transverse to the longitudinal axis of said implement frame, tongue power means connected to said transporting tongue for causing pivotal movement of said transporting tongue about said pivotal axis thereof.

3. A device according to claim 2 wherein said transporting tongue comprises first and second telescopic tongue members, one of said tongue members being pivotally mounted to said base portion and the other of said tongue members being telescoped within said one tongue member for longitudinal sliding movement between extended and retracted positions.

4. A device according to claim 3 wherein said telescoping tongue members each include holes therein adapted to register when said other tongue member is in its retracted and its extended positions, pin means extending removably within said registered holes for selectively locking said tongue members in said retracted and extended positions.

5. A device according to claim 2 wherein said tongue power means comprises a hydraulic cylinder connected at one of its ends to said tongue at a point spaced from said pivotal axis of said tongue, means securing the other end of said hydraulic cylinder to said elongated implement frame.

6. A device according to claim 1 wherein said transporting wheel assembly comprises a cross bar extending between said spaced apart vertical legs to form an H-shaped configuration, said securing means connecting said cross bar to said elongated implement frame.

7. A device according to claim 6 wherein said securing means comprises a clamp device for attaching said cross bar to said implement frame, strut means connected to said cross bar and also connected to said implement frame at points spaced from said cross bar.

8. A device of the kind described, comprising:
    an elongated implement having an elongated implement frame, implement wheels pivotal about an axis parallel to the longitudinal axis of said implement, and tongue means extending transversely from said longitudinal axis of said implement intermediate the opposite ends thereof;
    a transporting wheel assembly mounted to said implement frame intermediate the opposite ends thereof, said wheel assembly comprising a pair of spaced-apart vertical legs, each of said legs having upper and lower leg members which are vertically extensibly mounted with respect to one another, each of said lower leg members having a transporting wheel mounted thereon for rotation about an axis transverse to the longitudinal axis of said implement;
    power means connected to said legs for causing vertical extensive movement of said leg members from a retracted position wherein said transporting wheels are above said implement wheels to an extended position wherein said transporting wheels are below said implement wheels;
    a transporting tongue assembly having a base portion rigidly secured to one end of said elongated implement frame, and a transporting tongue for attaching to a pulling vehicle pivotally mounted to said base portion for swinging movement about an axis transverse to the longitudinal axis of said implement frame, and
    a hydraulic cylinder for causing pivotal movement of said transporting tongue about said pivotal axis, having first and second ends, said first end connected to said tongue at a point spaced from said pivotal axis of said tongue and said second end secured to said implement frame by a U-shaped frame having a horizontal base and two upstanding spaced apart legs, bolt means attaching said U-shaped frame to said implement frame with said tongue extending between said upstanding legs of said U-shaped frame and said second and of said hydraulic cylinder being attached to said horizontal base of said U-shaped frame.

* * * * *